Figure 1:
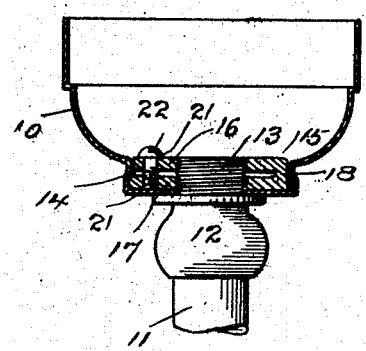

H. HUBBELL.
MEANS FOR LOCKING ELECTRIC SOCKETS TO FIXTURES.
APPLICATION FILED MAR. 16, 1907.

900,854.  Patented Oct. 13, 1908.

WITNESSES
H. A. Lamb.
S. W. Atherton.

INVENTOR
Harvey Hubbell
BY
A. M. Wooster
ATTORNEY

UNITED STATES PATENT OFFICE.

HARVEY HUBBELL, OF BRIDGEPORT, CONNECTICUT.

MEANS FOR LOCKING ELECTRIC SOCKETS TO FIXTURES.

No. 900,854.  Specification of Letters Patent.  Patented Oct. 13, 1908.

Application filed March 16, 1907. Serial No. 362,630.

*To all whom it may concern:*

Be it known that I, HARVEY HUBBELL, a citizen of the United States, residing at Bridgeport, county of Fairfield, State of Connecticut, have invented a new and useful Means for Locking Electric Sockets to Fixtures, of which the following is a specification.

This invention has for its object to provide a simple and inexpensive means for attaching electric sockets to fixtures in proper relative rotative positions which shall avoid the use of external screws and the various objections to old forms of attachment, shall be quick and certain in use and will greatly improve the appearance of the connection.

With this end in view I have devised the novel connection, of which the following description in connection with the accompanying drawing is a specification, reference characters being used to indicate the several parts.

Figure 2:
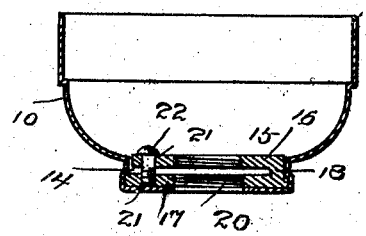
Figure 3:
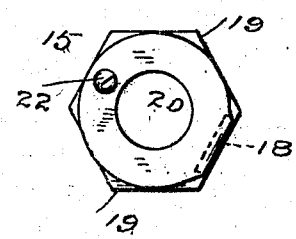
Figure 5:
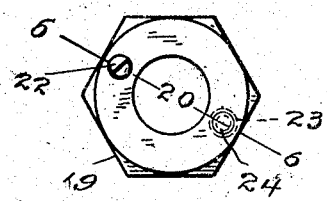
Figure 4:
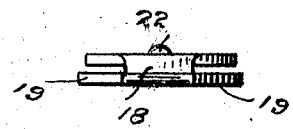
Figure 6:
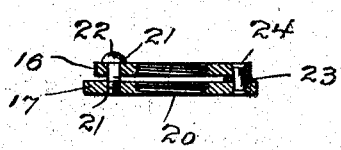

Figure 1 is a view partly in elevation and partly in section, illustrating my novel mode of attaching an electric lamp-socket to a nipple; Fig. 2 a section of the socket detached; Fig. 3 a plan view of one form of the clamping bushing, detached; Fig. 4 an edge view corresponding with Fig. 3; Fig. 5 a plan view of a variant form of clamping bushing, detached; and Fig. 6 is a section on the line 6—6 in Fig. 5.

For convenience in illustration I have shown the cap only of an electric lamp-socket shell which is indicated by 10.

11 denotes the tube or arm of an electric fixture which is provided with a nipple 12 having a male thread 13. At the base of the socket shell is a recess 14 which receives a clamping bushing indicated as a whole by 15. This bushing comprises two parts or wings indicated by 16 and 17, which lie parallel with each other and slightly separated and which may or may not be made integral as preferred.

In Figs. 1 to 4 inclusive, the parts or wings of the clamping bushing are shown as blanked out from sheet metal and connected together by a neck 18, the wings being then folded parallel with each other by bending the neck. The outer wing 17 of the clamping bushing is preferably provided with one or more angular faces 19 upon its edge and it, in proper relative rotative positions, is held against rotation in recess 14 by closing the metal of the cap against the angular faces.

The clamping bushing is provided with a central opening 20 through both wings thereof which is provided with a female thread to receive the thread upon the nipple. On the opposite side of the central opening from the neck, both wings of the clamping bushing are provided with holes 21, the hole in the lower wing being tapped to receive a screw 22 which passes freely through the upper wing. Owing to the fact that the metal of the cap is closed against the angular faces of the outer part 17, while the inner part 16 of the bushing is not directly connected in any way to the metal of the cap, I have provided an exceedingly simple and cheap structure whereby the bushing is firmly and permanently connected to the sheet metal cap, while the inner part of the bushing is left free to yield when the screw 22 is turned in.

In the form illustrated in Figs. 5 and 6, parts or wings 16 and 17 are not formed integral, the neck being dispensed with, a washer 23 being interposed between the wings on one side of the central opening and the wings being connected together by a rivet 24 passing through both wings and through the washer.

As is well known, the fixture which supports an electric lamp is frequently, and in fact usually, mounted so that it can not be conveniently turned on its axis. And the usual switch key projecting from the socket shell should project in a direction which will render it most convenient of access. With my invention, the socket shell can be conveniently secured tightly in any rotative position according to the direction in which it is desired that the switch key shall project. When the parts are to be connected, screw 22 is turned backward slightly, as in Fig. 2, and the thread of the nipple is turned into the clamping bushing, as in Fig. 1. When the socket is set in the desired position it is locked there by tightening screw 22 which moves the parts of the bushing toward each other and causes the thread of the bushing to clamp the thread upon the nipple, thereby locking the parts securely together. They may be readily detached, however, at any time by slightly loosening screw 22.

Having thus described my invention I claim:

1. A socket shell having a coupling device permanently secured thereto and comprising a two-wing bushing internally threaded to receive a threaded end of a fixture, the two wings of the bushing being slightly separated, one wing being inclosed by a portion of the shell and the other wing free inside of said shell, and a screw having its head inside the shell and connecting the two wings of the bushing whereby the frictional engagement of the threads of the coupling and fixture may be varied.

2. A socket shell having a coupling device permanently secured thereto and comprising a two-wing bushing internally threaded to receive a threaded end of a fixture, the two wings of the bushing being slightly separated, one wing having angular faces over which the metal of the shell is closed, the other wing being circular and being mounted free inside of said shell, and a screw having its head inside the shell and connecting the two wings of the bushing whereby the frictional engagement of the threads of the coupling and fixture may be varied.

In testimony whereof I affix my signature, in presence of two witnesses.

HARVEY HUBBELL.

Witnesses:
 A. M. WOOSTER,
 S. W. ATHERTON.